(12) United States Patent
Tsuda (10) Patent No.: US 8,054,351 B2
(45) Date of Patent: Nov. 8, 2011

(54) METHOD AND APPARATUS FOR IMAGING

(75) Inventor: Takashi Tsuda, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 128 days.

(21) Appl. No.: 12/714,191

(22) Filed: Feb. 26, 2010

(65) Prior Publication Data

US 2010/0149387 A1 Jun. 17, 2010

Related U.S. Application Data

(63) Continuation-in-part of application No. 12/406,795, filed on Mar. 18, 2009.

(30) Foreign Application Priority Data

Aug. 29, 2008 (JP) ................................. 2008-222296
Aug. 28, 2009 (JP) ................................. 2009-198966

(51) Int. Cl.
*H04N 5/217* (2011.01)

(52) U.S. Cl. ........................................ 348/251; 348/335

(58) Field of Classification Search .................. 348/241, 348/251, 335
See application file for complete search history.

(56) References Cited

U.S. PATENT DOCUMENTS

| 7,391,450 | B2 * | 6/2008 | Pinto et al. ..................... 348/251 |
| 2003/0220741 | A1 | 11/2003 | Hashimoto | |
| 2004/0125227 | A1 | 7/2004 | Tsuruoka et al. | |
| 2005/0275904 | A1 | 12/2005 | Kido et al. | |
| 2011/0187904 | A1 * | 8/2011 | Campbell ..................... 348/251 |

FOREIGN PATENT DOCUMENTS

| JP | 08-079773 | 3/1996 |
| JP | 09/307789 | 11/1997 |
| JP | 09-307789 | 11/1997 |
| JP | 11-150681 | 6/1999 |
| JP | 11-164194 | 6/1999 |
| JP | 2003-101844 | 4/2003 |
| JP | 2003-101884 | 4/2003 |
| JP | 2003-348602 | 12/2003 |
| JP | 2004-165958 | 6/2004 |
| JP | 2005-277618 | 10/2005 |

(Continued)

OTHER PUBLICATIONS

Japanese Patent Application No. 2008222296, Notice of Reasons for Rejection, mailed Jun. 2, 2009. (English translation).

(Continued)

*Primary Examiner* — Tuan Ho
(74) *Attorney, Agent, or Firm* — Blakely, Sokoloff, Taylor & Zafman LLP (57) ABSTRACT

According to one embodiment, a shading correction circuit, which corrects for the influence of ambient light quantity shading, for input image light from three CCD sensors of R, G and B, based on a distance from the center of a screen. A shading correction circuit does not make correction for a maximum correction area which is out of a circle with a distance a from the central part of a screen, and corrects for the influence of ambient light quantity shading for a minimum correction area with a distance b from the central part of a screen, after calculating a square $L^2$ of an address distance of each pixel of a correction object obtained by using a vertical distance and a horizontal distance from an address of the central part of a screen.

6 Claims, 7 Drawing Sheets

FOREIGN PATENT DOCUMENTS

| | | |
|---|---|---|
| JP | 2005-341033 | 12/2005 |
| JP | 2006-101115 | 4/2006 |
| JP | 2006-115275 | 4/2006 |
| JP | 2006-270919 | 10/2006 |
| JP | 2006-295807 | 10/2006 |
| JP | 2007-300360 | 11/2007 |

OTHER PUBLICATIONS

Japanese Patent Application No. 2009-198966; Notice of Reasons for Rejection; Mailed Oct. 26, 2010 and May 11, 2011 (English translation).

* cited by examiner

METHOD AND APPARATUS FOR IMAGING

CROSS-REFERENCE TO RELATED APPLICATIONS

This is a Continuation-in-Part application of U.S. patent application Ser. No. 12/406,795, filed Mar. 18, 2009, the entire contents of which are incorporated herein by reference.

This application is based upon and claims the benefit of priority from Japanese Patent Applications No. 2008-222296, filed Aug. 29, 2008; and No. 2009-198966, filed Aug. 28, 2009, the entire contents of both of which are incorporated herein by reference.

BACKGROUND

1. Field

One embodiment of the invention relates to shading correction of the ambient light quantity of a lens, generated in an imaging apparatus using an imaging element such as a triple-CCD imaging sensor and a triple-CMOS imaging sensor.

2. Description of the Related Art

In an imaging apparatus for imaging an object by means of a lens, it has been known that light quantity around a lens is decreased with respect to image light entering at the center of a lens.

Thus, in an imaging apparatus, light quantity decreased in a marginal area is usually corrected as shading correction of ambient light quantity.

Japanese Patent Application Publication (KOKAI) No. 2005-277618 discloses shading correction, in which a function of sum of a square of horizontal distance and vertical distance from the center of an image to each pixel is obtained by calculation, and is corrected for each color.

Japanese Patent Application Publication (KOKAI) No. 2004-165958 discloses correction of limb darkening by computing a function of sum of a square of horizontal distance X and vertical distance Y from the center of an image to each pixel.

Japanese Patent Application Publication (KOKAI) No. 2003-101844 discloses display of an image by rotating along the directions (vertical and horizontal directions) of a camera.

Japanese Patent Application Publication (KOKAI) No. Hei-11 150681 discloses an apparatus, in which electronic correction of a decrease in ambient light quantity, i.e. correction of light quantity is omitted in a certain range from the center of an image.

Japanese Patent Application Publication (KOKAI) No. Hei-11 164194 discloses an image processing method using quadratic, tertiary, or quartic equation according to the height of an image for compensating limb darkening.

Neither of the above patent applications, No. 2005-277618 and No. 2004-165958, mentions correction of a decrease in a signal level different for R, G and B, by using a triple-CCD imaging apparatus. Neither application describes color shading (coloring) in a marginal area of a screen, as a decrease in a signal level is different for each color component.

Both of the correction methods disclosed in the above patent applications, No. 2005-277618 and No. 2004-165958, needs large memory capacity for storing image data.

It is difficult for any one of the methods and apparatus disclosed in the above patent applications, No. 2003-101844, No. Hei-11 150681 and No. Hei-11 164194 to decrease color shading caused by the influence of a decrease in ambient light quantity occurred when three CCDs or CMOS sensors are used.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments will be described hereinafter with reference to the accompanying drawings. In general, according to one embodiment, an imaging apparatus comprising: an image sensor, a memory and a shading correction module. The image sensor least include triple-CCD sensors or triple-CMOS sensors configured to convert input image light to an image signal by each. The memory configured to hold a correction value of the image signal output from the image sensor. The shading correction module configured to determine a shading level of the shading correction of an area without of a range of an out of correction area, the range of the out of correction area is defined between a first circle has a radius from a center of a screen center to a first value and a second circle has a radius from the center of the screen center to a second value lager than the first value of the first circle, and calculating a square $L^2$ of an address distance of each pixel of a correction object obtained by using a vertical distance and a horizontal distance from an address of the center of the screen center.

Embodiments of this invention will be described in detail with reference to the drawings. The various modules of the systems described herein can be implemented as software applications, hardware and/or software modules, or components on one or more computers, such as servers. While the various modules are illustrated separately, they may share some or all of the same underlying logic or code.

Figure 1:
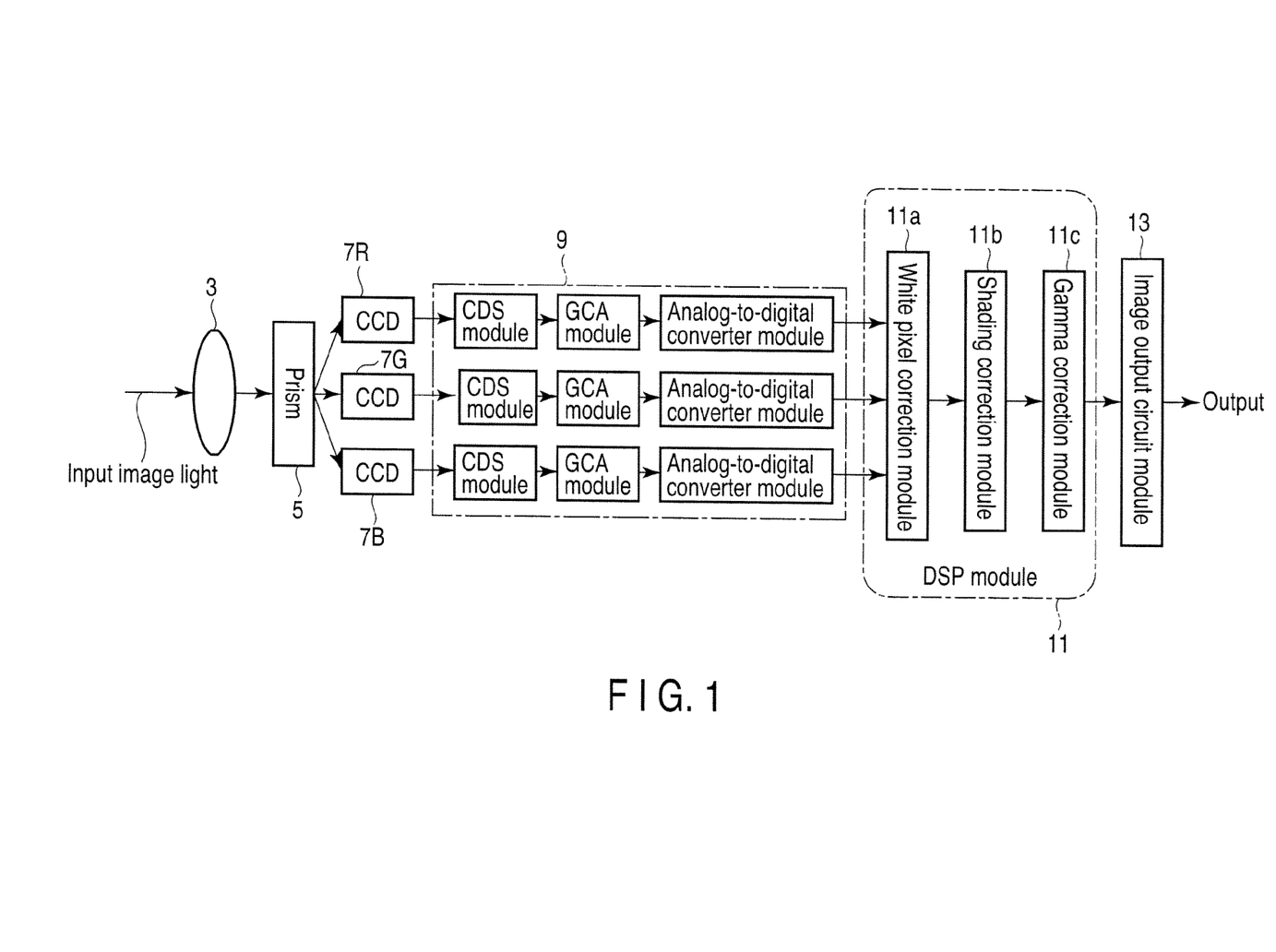
FIG. 1 is an exemplary diagram showing an example of an imaging apparatus to which an embodiment of the invention is applicable.

FIG. 1 is a schematic block diagram explaining an imaging apparatus to which an embodiment of the invention is applicable.

An imaging apparatus 1 shown in FIG. 1 includes a lens 3 to accept image light from an object, a prism 5 to separate the image light from the lens 3 into three primary colors, red (R), green (G) and blue (B) of additive color mixing, and a CCD sensor 7 (R, G, B) to convert the image light of R, G and B colors separated by the prism 5 to an input image signal.

The input image signal from the CCD sensor 7 (R, G, B) is decreased in a noise component through a preprocessor 9 (R, G, B), amplified to a predetermined gain, exposed to analog-to-digital conversion, and applied to a digital signal processor (DSP module) 11. The preprocessor 9 includes a correlated double sampling circuit module (CDS module) to eliminate a noise component from the input image signal from each CCD sensor, a gain control amplifier (GCA module) to give predetermined gain to the output of the CDS circuit module, and an analog-to-digital converter module to digitize an analog input image signal.

The digital signal processor (DSP module) 11 includes a white pixel correction module 11a which corrects a white pixel that is extremely increased when the sensitivity of the CCD sensor 7 (R, G, B) is increased or the storing time is prolonged, a shading correction module 11b which corrects the difference between the light quantities of image light passing through the center of the lens 3 and image light entering a peripheral area of the lens 3, among the image light whose white pixel is corrected by the white pixel correction module 11a, and a gamma (γ) correction module 11c which corrects the contrast of an input image signal.

It is to be noted that a single pulse is provided when a length of an information mark that should be recorded is the shortest unit 2T (T corresponds to one cycle of a basic clock frequency and 2T corresponds to a channel bit length in which two "1s" continue). Further, for example, a long pit like 11T is formed by applying a plurality of pulses. In order to form a smaller pit to realize a high capacity, a laser beam whose wavelength is shortened as much as possible must be combined with an objective lens having a high NA, but using a heat-sensitive resist film enables thermal formation of a small pit beyond an optical limit, especially a limit dependent on the wavelength of a laser beam.

The image signal corrected by the DSP module 11 is sent to a display unit (a monitor unit) or an image data storage unit (a large capacity storage module), through an image output circuit module (a camera link driver) 13, though they are not described in detail.

Figure 2:
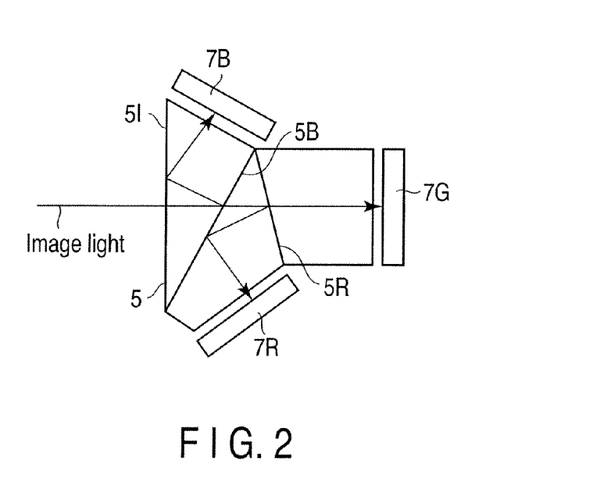
FIG. 2 is an exemplary diagram showing an example of relationship between a color separation prism incorporated in the imaging apparatus shown in FIG. 1, and a CCD sensor to output an image signal of a separated color component.

FIG. 2 shows an example of relationship between reflection planes of the prism 5, which reflect input image light to each channel of the CCD sensor 7, that is, color CCD sensors 7R, 7G and 7B, and each color prism.

Among the input image light entering the prism 5, an image component of a blue channel to be received by the channel B, or the CCD 7B, for example, is reflected by a first wavelength selection film 5B, then reflected by a light incident plane 51, and is guided to a not-described light-receiving surface of the CCD 7B. Among the input image light applied to the prism 5, an image component of a red channel to be received by the channel R, or the CCD 7R, for example, passes through a first wavelength selection film 5B, reflects on a second wavelength selection film 5R, reflects again on the backside of the first wavelength selection film 5B, and is guided to a not-described light-receiving surface of the CCD 7R. Among the input image light applied to the prism 5, an image component of a green channel to be received by the channel G, or the CCD 7G, for example, passes through a first wavelength selection film 5B and a second wavelength selection film 5R, and is guided to a not-described light-receiving surface of the CCD 7G.

By using the prism 5 shown in FIG. 2, the input image light entering through the lens 3 is converted to an input image signal for each color of R, G and B. In this embodiment, since the number of reflections of the image component of the green channel guided to the channel G, or the CCD 7G, in the prism 5 is minimum, it is used as a standard for correction of ambient light quantity shading (decrease in the quantity of light passing through a peripheral area of a lens) to be explained hereinafter.

Namely, in this embodiment, unevenness in color can be prevented by correcting the components R and B, with the component G fixed.

Figures 3A, 3B:
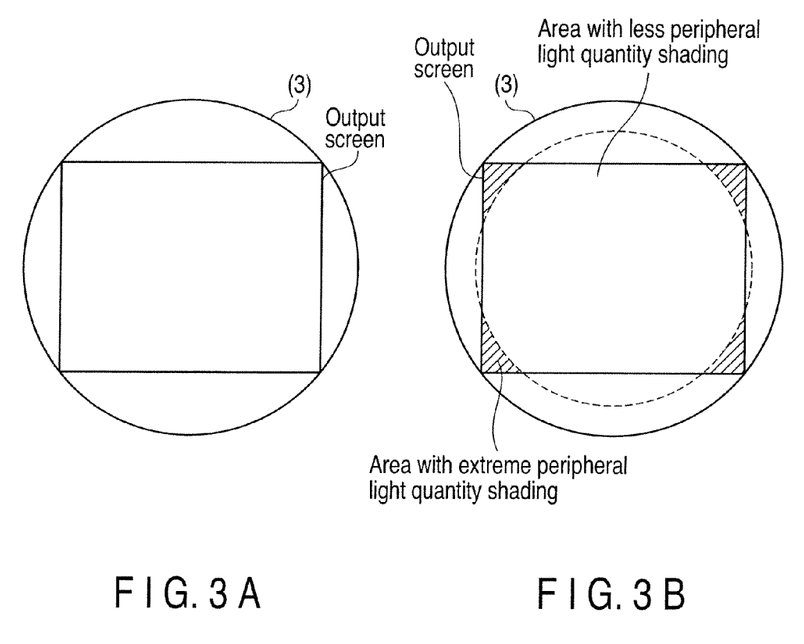
FIG. 3A is an exemplary diagram showing an example of a state with less ambient light quantity shading (to be corrected) specific to a lens incorporated in the imaging apparatus shown in FIG. 1.
FIG. 3B is an exemplary diagram showing an example of a state, in which ambient light quantity shading (to be corrected) specific to a lens incorporated in the imaging apparatus shown in FIG. 1 is greater than the lens shown in FIG. 3A.

FIGS. 3A and 3B are schematic diagrams explaining the concept of the decrease in light quantity of the image light entering a peripheral area of a lens.

As seen from FIGS. 3A and 3B, ambient light quantity shading is known as a characteristic specific to the lens 3, which accepts input image light.

FIG. 3A conceptually shows the relationship between input image light passing through a lens (3) with less ambient light quantity shading, and brightness (light quantity) of an output screen (a CCD sensor output).

FIG. 3B conceptually shows the relationship between input image light passing through a lens (3) with much ambient light quantity shading, and brightness (light quantity) of an output screen (a CCD sensor output).

In FIG. 3B, it is known that unevenness in color occurs at four corners with respect to the center of a screen, when a level of decrease in signals R, G and B, which occurs when the distance from the center of a circle exceeds a certain length.

Figure 4:
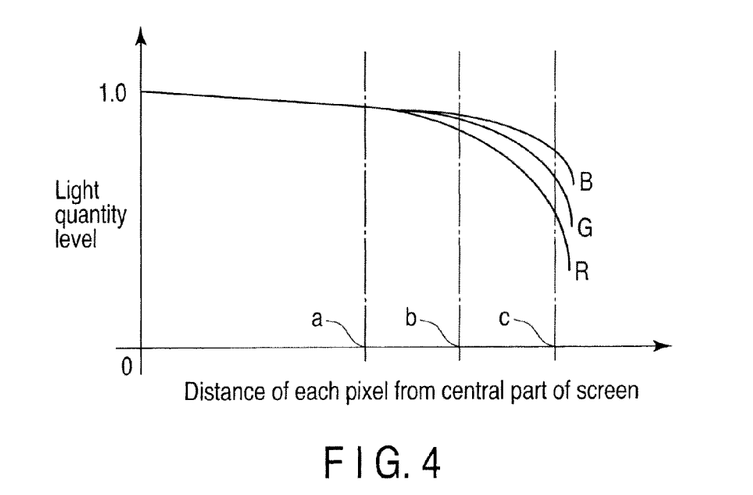
FIG. 4 is an exemplary diagram showing an example of a cause of unevenness in color due to ambient light quantity shading, in the imaging apparatus show in FIG. 1.

FIG. 4 shows an example of normalization of the influence of ambient light quantity shading to each color shown schematically in FIGS. 3A and 3B, by assuming the light quantity of input image light passing through the center of a lens to be "1".

As shown in FIG. 4, it is known that color components of input image light gradually decrease as the light passing through the lens center, that is, the distances of pixels from the central part of a screen increase. Further, as seen from FIG. 4, it is also known that even if the distances of pixels from the central part of a screen are the same, the light quantity level differs for each color (color component) separated by a prism (shown in FIG. 2).

In FIG. 4, the horizontal axis indicates the distance from the center of a screen (the center of a lens), in which the radius "a" defining a correction area MAX described later in FIG. 8, the radius "b" defining a correction area min, and the radius "c" taking an optional value in the outside of the correction area min (the radius "b") are positioned sequentially from the center. In the invention, the radius "a" (the correction area MAX) is approximately ¼ of a maximum value of H (horizontal direction) shown in FIG. 8. As described in detail later in FIG. 8, assuming the area defined by the radii "a", "b", and "c" is assumed to be a distance from the center, it can be explained as an "attenuation direction" of a light quantity level for each color, which is changed according to the distance from the central part of a screen (the center of a lens) explained in FIG. 4.

Figure 5A:
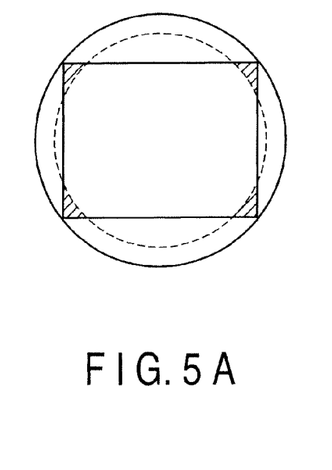
FIG. 5A is an exemplary diagram showing an example of a state, in which ambient light quantity shading to be corrected occurs.
Figure 5B:
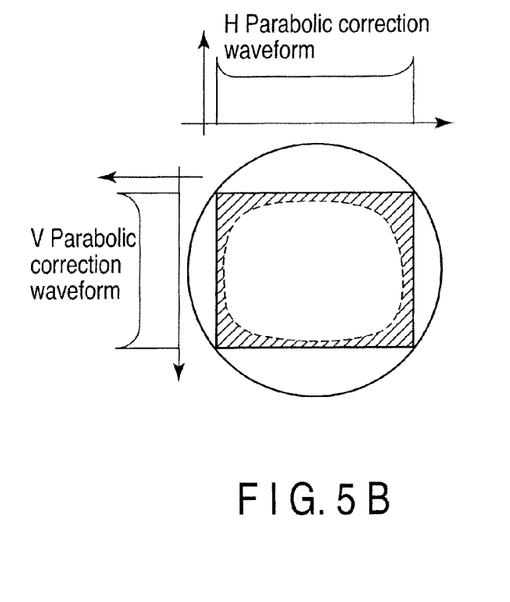
FIG. 5B is an exemplary diagram showing an example of parabolic correction, which is one of the methods of correcting ambient light quantity shading to be corrected explained in FIG. 5A.

FIGS. 5A and 5B show an example of parabolic correction, which is widely used for correction of the influence of ambient light quantity shading.

In an imaging apparatus using a lens causing ambient light quantity shading shown in FIG. 5A, correction is usually made in both vertical (V) and horizontal (H) directions, by increasing an image output from a CCD sensor for input image light in the vertical and horizontal directions, in which the distance from a peripheral area, or from the center of a screen is increased farther than a predetermined distance, as shown in FIG. 5B. In contrast, in the parabolic correction shown in FIG. 5B, it is known that necessary memory capacity (required for the correction) is increased. The "parabolic" correction needs large memory capacity, and it is known unsuitable for correction in only a marginal area to be executed by this application.

Figure 6:
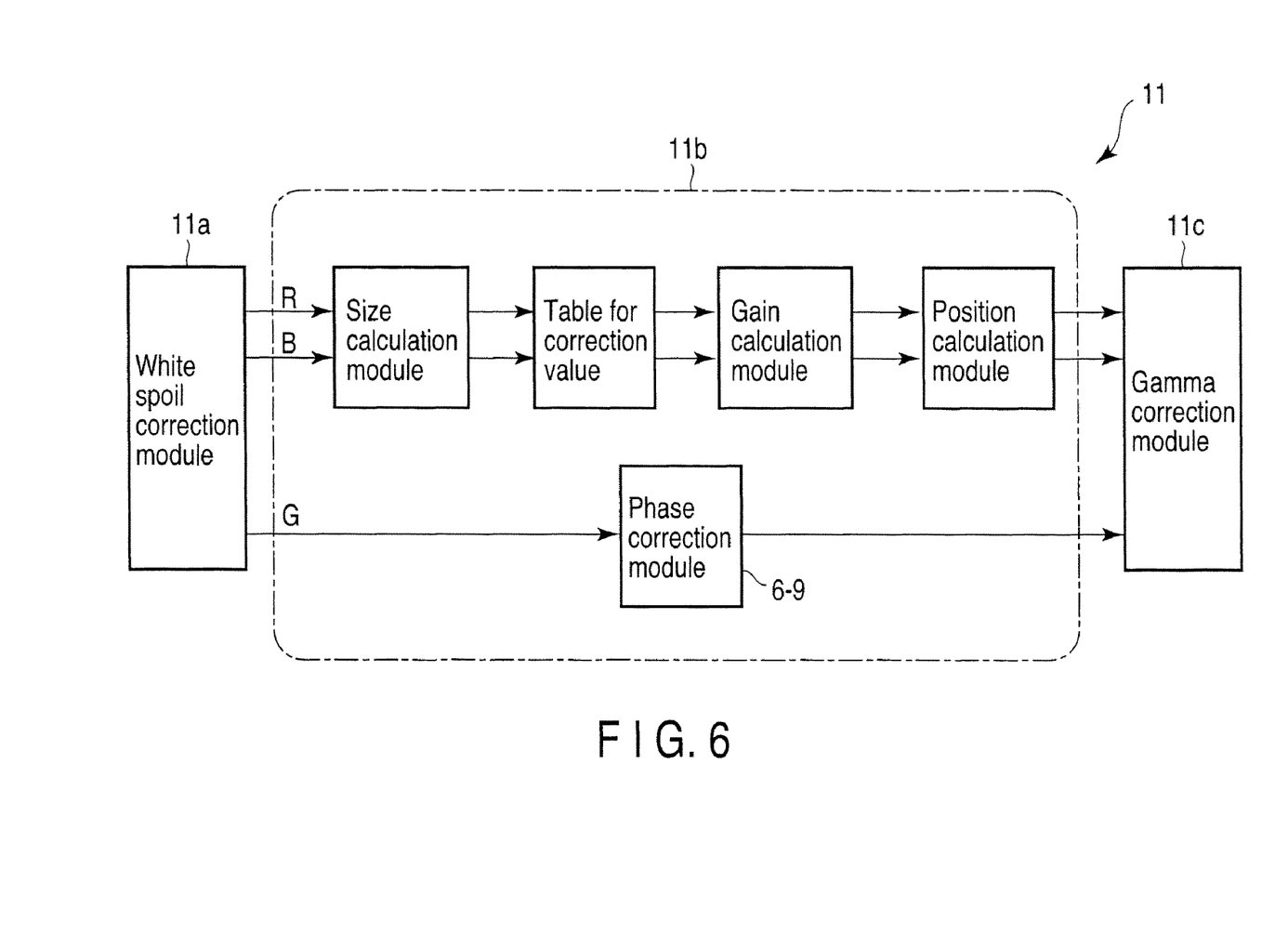
FIG. 6 is an exemplary diagram showing an example of a correction system for ambient light quantity shading correction applied to the imaging apparatus shown in FIG. 1.

FIG. 6 shows an example of a correction circuit, which is a correction system for ambient light quantity shading (a shading correction circuit) applied to the imaging apparatus shown in FIG. 1. FIG. 6 shows optimization of the light passing through the lens in FIG. 8, i.e., the parameters explained hereinafter, based on the horizontal distance (H) and vertical distance (V) from the central part of a screen (the center of a lens).

As shown in FIG. 6, the shading correction circuit (11b in FIG. 1) executes ambient light quantity shading for R and B components of the color component signals R, G, and B output from the white pixel correction module 11a, based on the component G, and outputs the resultant signal to the gamma (γ) correction module 11c. As explained in FIG. 7 and FIG. 8 hereinafter, the R and B components are corrected in the parameters defined by "Size", "Gain", and "Position", in the Size correction circuit 6-1, Gain correction circuit 6-5, and Position correction circuit 6-7, respectively. For the G component, though not explained in detail, phase shifting from the R and B components is prevented by a phase matching circuit 6-9. Between the Size correction circuit 6-1 and Gain correction circuit 6-5, a ROM table (6-3), which holds a correction data group defined based on a correction principle explained later in FIG. 8, is prepared. Each element shown in FIG. 6 may constitute a one-chip shading correction circuit 11b as an application specific IC (ASIC), for example.

Figure 7:
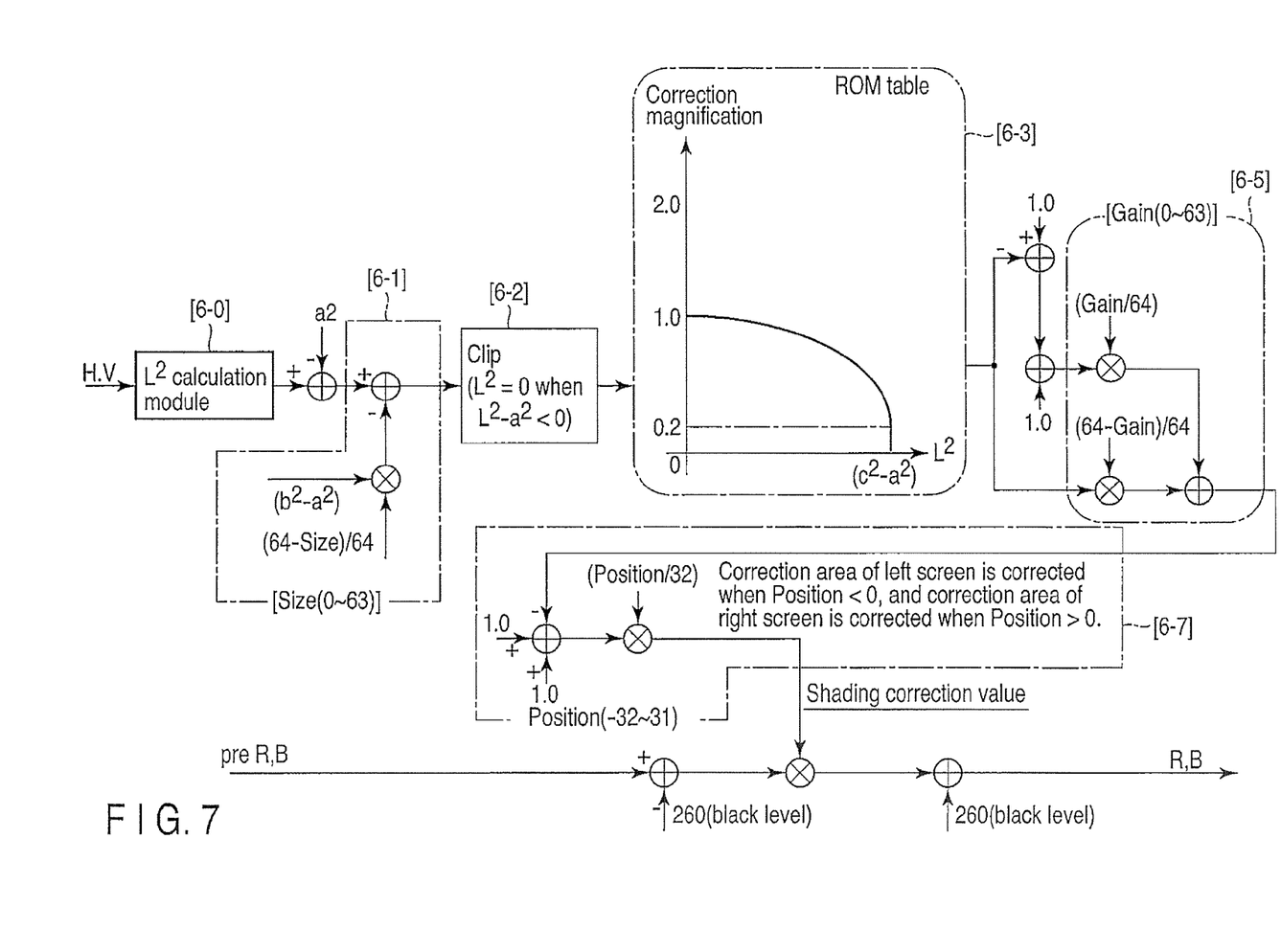
FIG. 7 is an exemplary diagram showing an example of actual correction using a correction system for ambient light quantity shading shown in FIG. 6.

FIG. 7 schematically shows an example of signal processing by the shading correction circuit shown in FIG. 6.

In the ambient light quantity shading correction circuit module shown in FIG. 7, at first, for the pixels to be corrected, a square "$L^2$" of an address distance for each pixel to be corrected is calculated by using a "$L^2$" calculation module ([6-0] in FIG. 6), by using the vertical distance (V) and horizontal distance (H) from the address of the central part of a screen. The horizontal distance (H) is $|H-H_0|$ assuming the address (coordinates) of imaging light passing through the center of a lens to be $H_0$, and the vertical distance (V) is $|V-V_0|$ assuming the address (coordinates) of imaging light passing through the center of a lens to be $V_0$ (refer to FIG. 8). Therefore, $L^2=|H-H_0|^2+|V-V_0|^2$.

Figure 8:
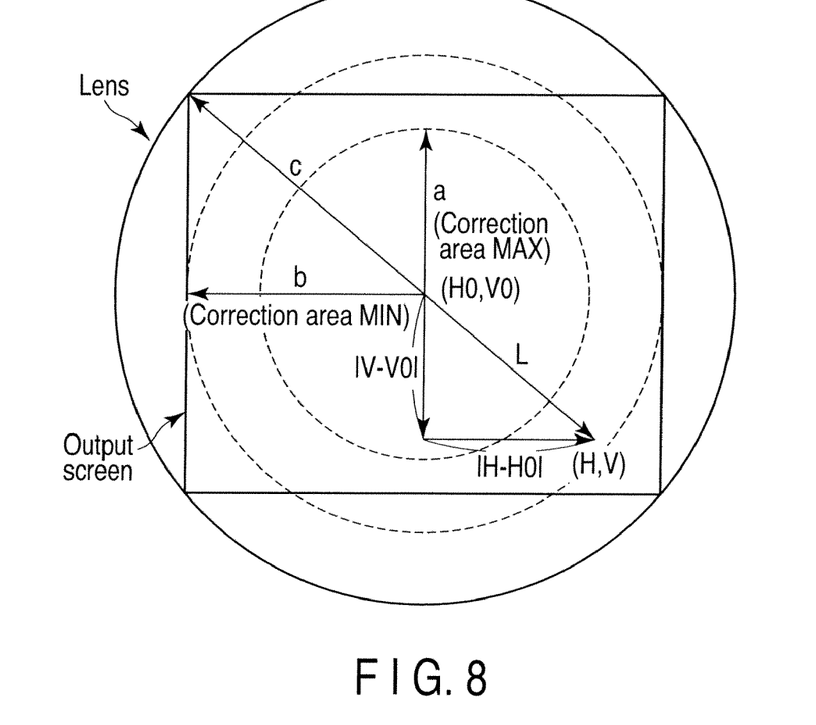
FIG. 8 is an exemplary diagram showing an example of the principle of correction in the ambient light quantity shading correction system shown in FIGS. 6 and 7.

Here, in the output screen shown in FIG. 8, "Size" is defined as a correction area parameter, which comes in a circle with a distance b from the central part of a screen, as a minimum correction area, and comes out of a circle with a distance a, as a maximum correction area. By controlling the radius of the circle, a correction area is adjusted ("Size" calculation [6-1] in FIG. 7).

As for the central part of a screen or nearby areas which comes in the circle with a radius "a" or smaller, the necessity of shading correction is considered to be low, and correction is omitted to decrease the memory capacity (to decrease the scale) in FIG. 8. In other words, in the central part of a screen within a circle with radius "a", or the surrounding area, the necessity of shading correction is considered to be substantially low, and the correction is omitted in order to decrease the capacity of memory (to reduce the scale). As explained in detail later, in this application, correction is made only for the area outside a circle with radius x (a<x<b) by using the above mentioned "Size" parameter, and correction is omitted for the area inside a circle with radius "a".

Next, a light quantity unrelated area (an area unnecessary to correct light quantity) subtract $a^2$ from $L^2$ (having $L^2-a^2$) on the X-axis, that is, an attenuation direction waveform is created for the signal R (the output of CCD 7R) and signal B (the output of the CCD 7B), by using trigonometric functions, e.g., cosine function (cos x). At this time, an amplification waveform (a waveform in an amplifying direction), which is amplified equivalently to the value of attenuation output from an attenuation waveform (a waveform in an attenuation direction), is also created by calculation ([6-3] in FIG. 7). At this time, an amplification waveform (the waveform in an amplifying direction (6-3 in FIG. 7)), which is amplified by the degree equivalent to the value of attenuation output from an attenuation waveform (a waveform in the attenuating direction), is also created at the same time by the calculation as described later in detail.

Next, a correction value parameter "Gain Value" is prepared for the value (output value) obtained by each of the amplification waveform (the waveform in an amplifying direction) and attenuation waveform (the waveform in an attenuating direction). The output value is multiplied by the "Gain Value", and the resultant value is added to the output value. Then, a "Gain Value" that is a correction value parameter is multiplied by a "Gain" calculation ([6-5] in FIG. 7), and the product is added to the values (output values) obtained by the amplification waveform (the waveform in an amplifying direction) and the attenuation waveform (the waveform in an attenuation direction). The "Gain Value" consists of the waveform in an attenuation direction obtained by [6-3] in FIG. 7, and the amplification waveform (the waveform in an amplifying direction) indicating the reverse direction characteristic with respect to the waveform in an attenuating direction.

The value obtained here is used as a "Position" parameter, and area correction is made for left and right screens ([6-7] in FIG. 7). The "Position" is independent of plus and minus (±). When the "Position" is smaller than 0, a correction area in the left screen is corrected. When the "Position" is larger than 0, a correction area in the right screen is corrected.

More specifically, the distance $L^2$ from the address $(H_0, V_0)$ of the center of the screen is obtained from information about input addresses H and V in FIG. 7, according to the theorem of three squares.

Next, "out of a circle with a radius a" is defined as a maximum correction area, and "out of a circle with a radius b" is defined as a minimum correction area, taking the central part of a screen as the center.

Namely, as described above, the necessity of shading correction is considered low for the central part of a screen that is within a circle with a radius a, and shading correction is omitted. At the same time, a light quantity unrelated area (an area unnecessary to correct light quantity) with subtract $a^2$ from $L^2$ (having $L^2-a^2$) on the X-axis, that is, an attenuation direction waveform is created for the signal R (the output of CCD 7R) and signal B (the output of the CCD 7B), by using trigonometric functions.

The $(L^2-a^2)$ is expressed as follows by using the "Size (0-63)" that is a parameter to control a correction area, according to the ROM table indicated by [6-3] in FIG. 6, considering the relation to the X-axis,

["$L^2-a^2$" after the correction]=$(L^2-a^2)-(b^2-a^2)\times(64-\text{Size})/64$.

As for the ["$L^2-a^2$" after the correction<0], the value is insufficient for ambient light quantity shading correction, and all parameters are clipped to "0" (all are zeroed), and input to the ROM table shown by [6-3] in FIG. 7. On the other hand, in a maximum correction area, the area in a circle with a radius "a" is assumed to be an area which is not corrected regardless of the value of the "Size" parameter, and no correction is made for the area of $L^2<a^2$ indicating the area in the circle with a radius "a" (the correction ratio is 1.0).

Figure 9:
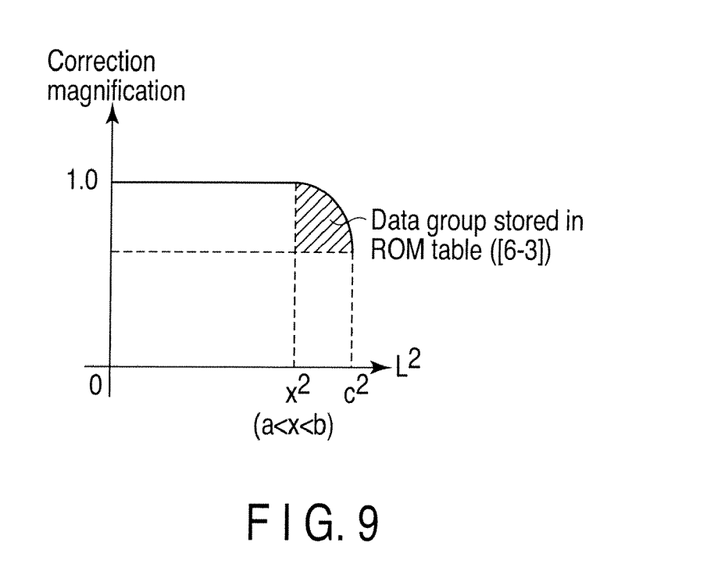
FIG. 9 is an exemplary diagram showing an example of a correction data group stored in a ROM table used in the ambient light quantity shading correction system shown in FIG. 6.

The ROM table shown in FIG. 7 corresponds to an area (a shaded area in FIG. 9) separated farther than the distance $x^2$ from a center image (the center of a screen), in correction characteristics to be explained later by using FIG. 9. The distance x is a<x<b as explained hereinbefore. According to FIG. 8, a<b<c, if b is close to c, less area needs ambient light quantity shading correction. In contrast, if b is close to a, an area needing ambient light quantity shading correction is changed. The capacity of memory to be ensured can be reduced by keeping the used amount of memory within a certain amount, while defining a circle with a distance b whose distance from the center of a screen is farther than the distance a, eliminating correction for imaging light inside the distance a, and changing both values.

A maximum correction ratio (a maximum value of correction magnification in FIG. 9) is assumed to be ±80%, for example. Assuming the maximum correction ratio to attenuation of an attenuation waveform (a waveform in an attenuating direction), i.e. a table for maximum attenuation correction, is created by calculation. The value ±80% indicates that when an effective value of the attenuation waveform (the waveform in an attenuating direction) shown by [6-3] in FIG. 7 is 20%, a lower limit value is "1−0.8(80%)=0.2(20%)=0.2".

The correction values (attenuation waveform and amplification waveform) are multiplied and added in the "Gain (0-63)" calculated by gain calculate [6-5] in FIG. 7. The system shown in FIG. 7 is designed so that maximum attenuation correction is output when "Gain=0", and maximum amplification correction is output when "Gain=63". The output from [6-3] in FIG. 7 (corresponding to FIG. 9) is divided into two systems as shown in the drawing. In one output, a correction value [0],i.e. a value obtained by subtracting from a correction magnification 1.0, i.e. the above mentioned lower limit value "1−0.8 (80%)=0.2 (20%)=0.2" is added to a correction value [0],i.e. a value obtained by adding to a correction magnification 1.0, i.e. the above mentioned upper limit value "1+0.8=1.8 (180%)=1.8". Hereinafter, in this application, as the "Gain" value is assumed to be 64, the value is multiplied by (Gain/64) is multiplied. As a result, an amplification waveform (a correction value) is obtained. In the other output, the value is multiplied by (64−Gain)/64. As a result, an attenuation waveform (a correction value) is obtained. Thereafter, both values area added, and the "Gain" value is set.

The output value is multiplied by the above-described "Position (−32 to 31) or any one in the range of ±32", as a parameter to adjust a correction area in left and right screens. The "Position (−32 to 31)" is substantially equivalent to simultaneous correction of "Gain (0 to 63)" and "Size (0 to 63), independent of the left and right screens, and can be regarded as a parameter to correct deviation of the lens optical axis in the horizontal direction at the center of a screen. In particular, a radius L of a circle defining a correction area of ambient light quantity shading correction is obtained by the equation $L^2=|H-H_0|^2+|V-V_0|^2$ as described above. If L' is obtained assuming that a lens is displaced by $\lceil H_1 \rfloor$ in the horizontal direction, a radius L' of a circle defining a correction area of ambient light quantity shading correction is obtained by the equation $L'^2=|H-H_0-H_1|^2+|v-V_0|^2$. Therefore, changing of "Gain" value and "Size" is easily replaced by changing of "Position" value.

Figure 10A:
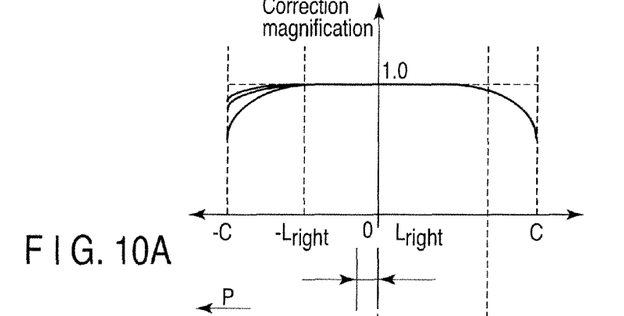
FIGS. 10A and 10B are exemplary diagrams each showing an example of a configuration to realize processing of "Size", "Gain" and "Position" shown in FIG. 6 (a shading correction circuit)
Figure 10B:
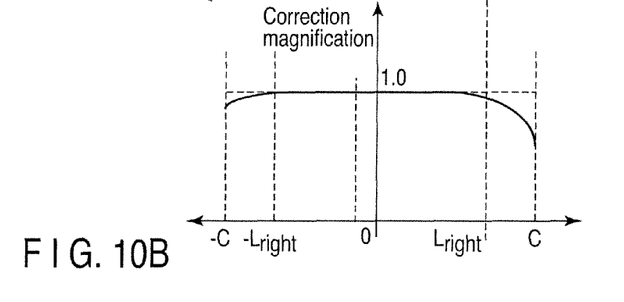

In other words, as shown in FIGS. 10A and 10B, the level of one of the left and right outputs in the horizontal direction (corresponding to the "Gain" value) is changed by moving the center of a screen in the horizontal direction by using the "Position". As a result, the light quantity level (FIG. 10B) of the side moved by the "Position" (in the direction of a arrow P) is increased as compared with the light quantity level in FIG. 10A.

The correction value calculated as described above is used as a correction value for ambient light quantity shading.

In actual processing, a black level value corresponding to "Black", which it is usually unnecessary to correct, is subtracted for the signals R (R component) and B (B component), the difference is multiplied by the correction value for ambient light quantity shading obtained in the above-described process, and the black level value is added to the product, thereby providing final corrected signals R and B.

As described above, an ambient light quantity shading correction system having a parameter correction area and a correction value can be obtained (The above description means a procedure of designing the ambient light quantity shading correction module 11b.)

In the above description, the parameters defined as "Size (0-63), "Gain (0-63)", "Position (−32-31), and maximum correction rate ±80% are just examples, and may be changed to other appropriate values.

Figure 11:
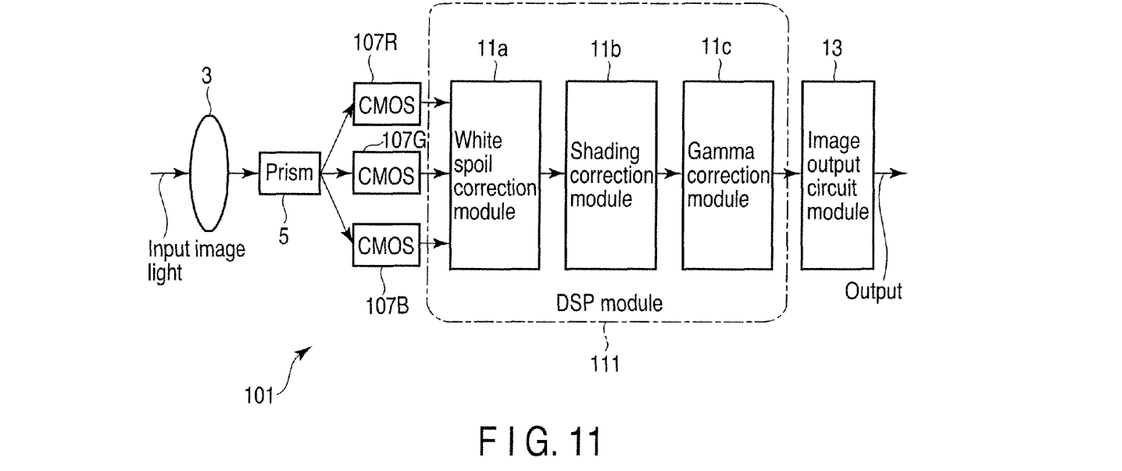
FIG. 11 is an exemplary diagram showing an example of another imaging apparatus to which embodiments of the invention are applied.

FIG. 11 shows another embodiment of the imaging apparatus shown in FIG. 1. The imaging apparatus shown in FIG. 11 is an example using a CMOS image sensor instead of a CCD image sensor. As for ambient light quantity shading correction and elimination of color shading, a correction circuit substantially the same as in the example shown in FIG. 1 can be used.

An imaging apparatus 101 shown in FIG. 11 includes a lens 3 to accept imaging light from an imaging object, a prism 5 to separate imaging light input from the lens 3 into red (R), green (G), and blue (B) components, i.e. three primary colors of additive color mixing, and a CMOS sensor 107 (R, G, B) to convert imaging light for each color of R, G, and B separated by the prism 5 into input image signals.

The input image signals from the CMOS sensor 107 (R, G, B) are digitally processed for each color component in a signal processing block (DSP) 111, subjected to shading correction to correct the light quantity difference in the imaging light passing through the center of the lens 3 and the peripheral area of the lens 3, and gamma (γ) correction to correct the contrast of the input image signal, and output to a display unit (a monitor) or an image data storage (a large-capacity memory), not described in detail, through an image output circuit (a camera link driver) 13.

As explained herein, by using one of the embodiments of the invention, when the influence of ambient light quantity shading is corrected, exact correction (regional correction) is possible regardless of shading levels. Overcorrection can also be prevented. Namely, in this shading correction method, an ambient light quantity shading image area is considered to be a circle specific to a lens, correction is made based on the distance from a center image (the center of an image) (i.e., a circle), and shading correction is possible without causing differences in color components (unevenness in color). Particularly, in an area where the distance from the center of a screen is farther than a certain distance, when the decrease levels of R, G and B are not even, unevenness in color at the four corners with respect to the center of a screen can be prevented. Overcorrection can also be prevented. Further, the memory capacity to store a correction value can be decreased.

Besides, as it is unnecessary to store a light quantity distribution around a lens, an interchangeable C-mount lens can be used, and the memory capacity to store a correction value can be decreased. Namely, it is unnecessary to adjust a correction value each time a lens is changed, and it is unnecessary to store a correction value for each lens.

Further, in this method, a correction area can be adjusted by controlling the size of a circle from the central part of a screen, and overcorrection can be prevented in an area where correction is unnecessary 1% in case of 2× recording, and it was 6.2% in case of 3× recording.

Therefore, in an imaging apparatus using a triple-CCD imaging apparatus, it is possible to realize an imaging apparatus and an imaging method with ease and low cost, which can easily correct the influence of different decrease levels of signal for each color component as the quantity of ambient light is decreased.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An imaging apparatus comprising:
   an image sensor least includes triple-CCD sensors or triple-CMOS sensors each configured to convert input image light to an image signal;
   a memory configured to hold a correction value of the image signal output from the image sensor; and
   a shading correction module configured to determine a shading level of the shading correction of an area of a range of an out of correction area, the range of the out of correction area is defined between a first circle having a radius from a center of a screen center to a first value and a second circle having a radius from the center of the screen center to a second value larger than the first value of the first circle, and calculating a square $L^2$ of an address distance of each pixel of a correction object obtained by using a vertical distance and a horizontal distance from an address of the center of the screen center.

2. The imaging apparatus of claim 1, wherein the shading correction module corrects unevenness in color by amplification or attenuation, for two colors among image signals of each color with reference to green (G).

3. The imaging apparatus of claim 1, wherein the shading correction module sets a correction amount independently of left and right directions of the screen, by way of moving of a horizontal direction of the center of the range of the out of correction area.

4. A method of an imaging comprising:
   determining a first circle has a radius from a center of a screen center to a first value and a second circle has a radius from the center of the screen center to a second value lager than the first value of the first circle;
   determining an area of a range of an out of correction area, the range of the out of correction area is defined within from the first circle to the second circle; and
   correcting unevenness in color and shading caused by the influence of ambient light, after calculating and getting a square $L^2$ of an address distance of each pixel of a correction object obtained by using a vertical distance and a horizontal distance from an address of the center of the screen center, and determining a shading level of the shading correction of an area a range of an out of correction area, in image signal output from triple-CCD sensors or triple-CMOS sensors.

5. The imaging method of claim 4, wherein sets a correction amount independently of left and right directions of the screen, by way of moving of a horizontal direction of the center of the range of the out of correction area, in the correcting of the shading caused by the influence of ambient light.

6. The imaging method of claim 4, wherein the correcting unevenness in color and shading caused by the influence of ambient light is caused amplification or attenuation, for two colors among image signals of each color with reference to green (G).

* * * * *